US006657201B2

United States Patent
DeJule (10) Patent No.: US 6,657,201 B2
(45) Date of Patent: Dec. 2, 2003

(54) COVER PLATE HAVING SPACER LIP WITH HERMETIC BARRIER FOR RADIATION IMAGER AND METHOD OF MANUFACTURING SAME

(75) Inventor: Michael Clement DeJule, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 214 days.

(21) Appl. No.: 09/681,960

(22) Filed: Jun. 29, 2001

(65) Prior Publication Data

US 2003/0001100 A1 Jan. 2, 2003

(51) Int. Cl.⁷ .................................................. G01T 1/24
(52) U.S. Cl. ............................. 250/370.11; 250/370.09
(58) Field of Search ........................ 250/370.11, 370.09

(56) References Cited

U.S. PATENT DOCUMENTS

| | | | |
|---|---|---|---|
| 4,029,964 A | | 6/1977 | Ashe |
| 4,201,612 A | * | 5/1980 | Figge et al. ................ 156/224 |
| 5,132,539 A | | 7/1992 | Kwasnick et al. |
| 5,153,438 A | | 10/1992 | Kingsley et al. |
| 5,179,284 A | | 1/1993 | Kingsley et al. |
| 5,187,369 A | | 2/1993 | Kingsley et al. |
| 5,517,031 A | | 5/1996 | Wei et al. |
| 5,545,899 A | * | 8/1996 | Tran et al. .............. 250/370.09 |
| 5,585,280 A | | 12/1996 | Kwasnick et al. |
| 5,641,984 A | | 6/1997 | Aftergut et al. |
| 5,707,880 A | * | 1/1998 | Aftergut et al. .......... 250/370.09 |
| 6,025,598 A | * | 2/2000 | Tago ........................ 250/370.01 |
| 6,091,795 A | * | 7/2000 | Schafer et al. .................. 378/19 |
| 6,103,147 A | * | 8/2000 | Rybicki ........................ 264/1.21 |
| 6,146,489 A | * | 11/2000 | Wirth ........................... 156/280 |
| 6,148,029 A | | 11/2000 | Fert |
| 6,149,748 A | * | 11/2000 | Boedinger et al. .......... 156/89.11 |
| 6,172,371 B1 | * | 1/2001 | DeJule et al. .............. 250/370.11 |
| 6,278,118 B1 | * | 8/2001 | Homme et al. ............ 250/370.11 |
| 6,350,990 B1 | * | 2/2002 | Wei et al. .................. 250/370.11 |
| 6,433,340 B1 | * | 8/2002 | Penn ........................... 250/361 R |
| 6,483,115 B1 | * | 11/2002 | Castleberry ............... 250/370.11 |
| 6,541,774 B1 | * | 4/2003 | DeJule et al. ............. 250/370.11 |
| 6,563,121 B1 | * | 5/2003 | Schreiner et al. .............. 250/368 |

FOREIGN PATENT DOCUMENTS

EP        0 147 561        7/1985

* cited by examiner

Primary Examiner—Diego Gutierrez
Assistant Examiner—Amy R. Cohen
(74) Attorney, Agent, or Firm—Jean K. Testa; Patrick K. Patnode (57) ABSTRACT

A cover plate for a solid state radiation imager having a substrate on which are disposed a photosensor array and a scintillator optically coupled to the photosensor array. The cover plate has a lip adjacent a periphery thereof, at least a portion of the lip comprising a hermetic barrier, the cover plate and lip extending over the scintillator and photosensor array, the lip being adhered and sealed to the substrate. Methods of forming a cover plate with a lip and of assembling the cover plate having a lip with a substrate so as to enclose a photosensor array coupled to a scintillator are also disclosed.

30 Claims, 7 Drawing Sheets

COVER PLATE HAVING SPACER LIP WITH HERMETIC BARRIER FOR RADIATION IMAGER AND METHOD OF MANUFACTURING SAME

BACKGROUND OF INVENTION

This invention relates generally to solid state radiation imagers and, in particular, to a cover plate having a spacer lip with a hermetic barrier (e.g., a moisture barrier) and which encloses the imager array and protects it from adverse environmental conditions.

Solid state radiation imaging arrays typically comprise a photosensor array coupled to a scintillator. The radiation to be detected (e.g., x-rays or the like) penetrates the scintillator and is absorbed by the scintillator material in an event that results in the release of optical photons. The photosensor array coupled to the scintillator is used to detect the optical photons, providing a spatial location (x,y) in the array that corresponds with the point in the scintillator at which the incident radiation was absorbed. Readout of the photosensor array allows electrical signals to be generated that correspond to the pattern of absorbed radiation. The data embodied in such electrical signals can be presented in a visual display or otherwise processed to allow analysis of the radiation pattern.

The imager includes a glass substrate on which the photosensor array, typically comprising layers of thin films (including amorphous silicon) patterned into thin film transistors (TFT) transistors and photodiodes, is disposed. The scintillator layer typically comprises a salt, such as cesium iodide (CsI), that is deposited over the photosensor array on the substrate. The scintillator converts x-rays into visible light that is in turn detected by the photodiodes. The scintillator structure can be rapidly degraded by moisture, resulting in degraded optical performance and consequent degraded imager performance. Degradation can occur even during exposure to ambient room humidity. Accordingly, it is important that the scintillator material be protected from exposure to ambient conditions by a hermetic cover material.

The cover material for the imager array is, desirably, highly transmissive to x-rays. It further must be structurally robust such that it retains its form and effectiveness to provide the desired moisture resistance in a variety of environments, such as conditions (e.g., temperature extremes) that can be experienced during shipping and conditions of prolonged use and radiation exposure. For example, the cover material must be able to retain its form and moisture resistant qualities through thermal cycling without deformation (such as delamination or deformation) that results in a breach of the hermetic barrier around the scintillator. Any breach of the seal around the scintillator can result in degradation of the scintillator material and adversely affect performance of the imager. The cover material must adhere well to glues (e.g., epoxy material) used to cement the device together and must be able to retain these desirable characteristics over the expected life and operational environment (e.g., radiation exposure) of the imager. Additionally, the cover material should have the characteristics of being readily formed in large, thin sheets required for large area imagers (e.g., about 100 $cm^2$ or greater), such as typically are used for chest x-ray systems.

A difficulty is experienced with some imager arrangements when assembling the cover plate with the substrate using a single bead of epoxy to seal the two pieces as the compression of the air between the two pieces can cause displacement of the epoxy bead.

Other approaches to improving the seal typically include additional fabrication steps, resulting in additional handling and time requirements, contributing to increased costs.

Accordingly, there is a need to provide a satisfactory hermetic seal between the periphery of the cover plate and the mating surface of the substrate in a solid state radiation imager assembly which provides an affective seal and also is efficient and easy to manufacture.

SUMMARY OF INVENTION

In one embodiment of the invention, a cover plate for a radiation imager having a photosensor array disposed on a substrate and a scintillator optically coupled to the photosensor array comprises a lip on the inner mains surface of the cover plate, with a at least a portion of the lip comprising a hermetic barrier; and a moisture resistant adhesive layer disposed to seal the lip to the substrate.

A process for forming a cover plate for a solid state radiation imager includes the steps of providing a cover plate; forming a lip on the inner main surface of the cover plate adjacent a periphery of the cover plate, with at least a portion of the lip comprising a hermetic barrier; applying a layer of a moisture resistant adhesive to the hermetic barrier and a portion of the substrate of the array; and assembling the cover plate with the surface of the substrate.

DETAILED DESCRIPTION

Figure 1:
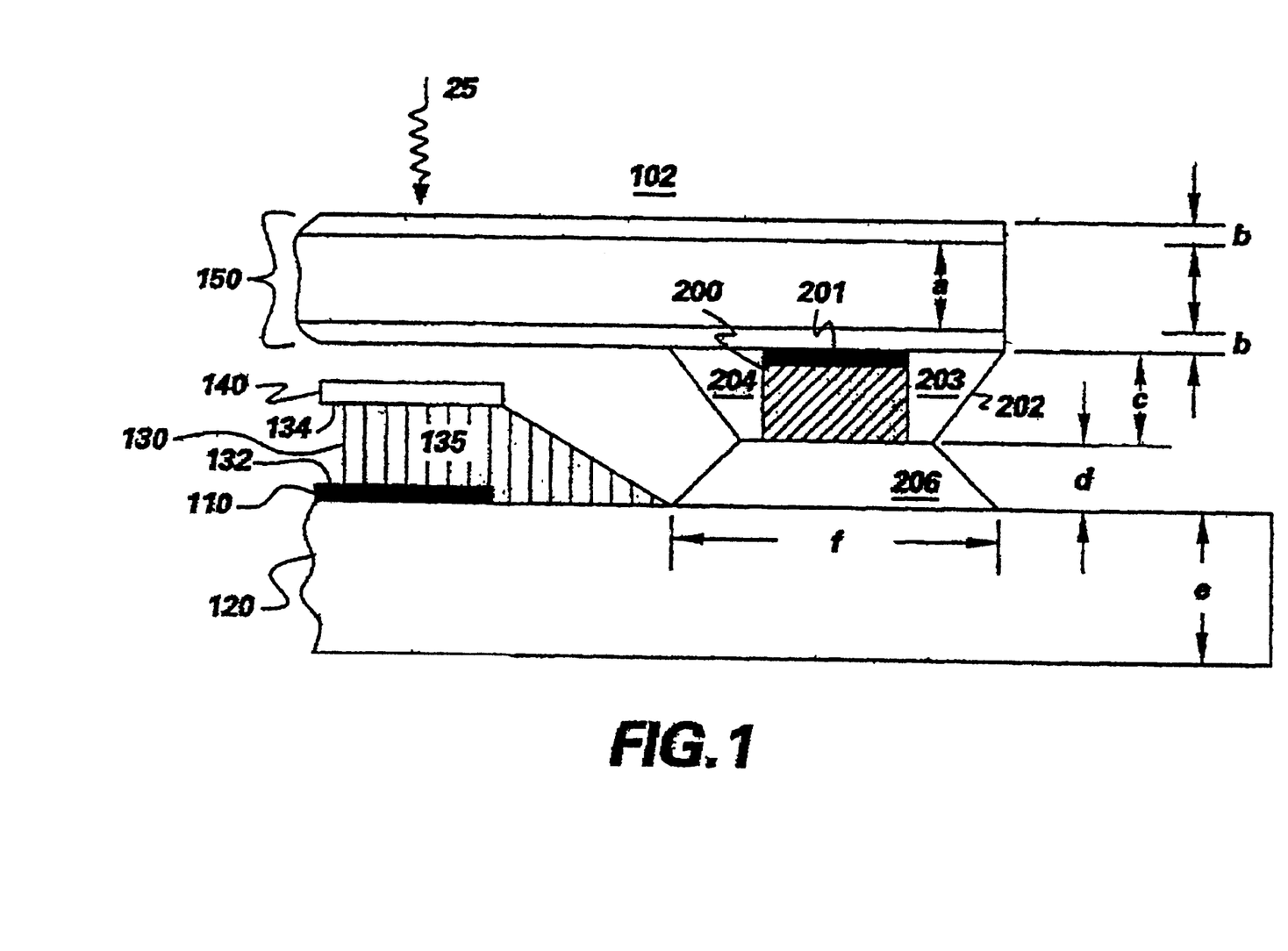
FIG. 1 is a schematic, cross sectional and elevational view of a radiation imager, in accordance with a first embodiment of the invention.

As shown in FIG. 1, a solid state radiation imager 102 comprises a substrate 120, typically of a glass material which is rigid and structurally strong, on which is formed a photosensor array 110 and a scintillator 130 optically coupled to the photosensor array. An optional reflective layer 140 may be formed on the scintillator 130. A cover plate 150 covers the scintillator 130 and the photosensor array 110 (and the reflective layer 140, if present) and a peripheral edge portion thereof is adhered and sealed to the substrate 120 as described below. In operation, imager 102 is positioned so that the radiation to be detected, for example x-rays 25 and the like that have passed through the object that is being imaged, is incident on scintillator 130. Incident radiation typically enters scintillator 130 and is absorbed in the scintillator material in an event resulting in the generation of optical photons. Detection by photosensor array 110 (typically an array of photodiodes) of the optical photons emitted when the incident radiation is absorbed by the scintillator material enables the generation of an electrical signal corresponding to the pattern of the incident radiation.

Scintillator 130 typically comprises a scintillating material that is a salt, such as cesium iodide or the like. A scintillator first surface 132 is disposed over and optically coupled to photosensor array 110 so as to enable the passage of optical photons from the scintillator 130 to the photosensor array 110. Most salts that are scintillator materials are sensitive to moisture absorption and will structurally and optically degrade when exposed to moisture.

Scintillator 130 comprises a plurality of columnar structures 135 that aid in the spatial localization of optical photons generated in the scintillator and may comprise a block of scintillator material or the like. The optical reflective layer 140, typically (but not necessarily) disposed over scintillator second surface 134, serves to reflect optical photons generated within the scintillator 130 back into the scintillator towards scintillator first surface 132 so that the photons can be detected by photosensor array 110. Reflective layer 140 typically comprises a compliant (e.g., deformable to conform to the columnar protrusions) material that is relatively transparent to x-rays but optically reflective. One example is a material having the trade name Opticlad.

The protective cover plate 150 is disposed to provide a seal over the second surface 134 of scintillator 130 (and the reflective layer 140, when present) and is both secured and sealed to the substrate 120 in order to protect the scintillator 130 from exposure to ambient environmental conditions, such as moisture in the ambient air. Protective cover plate 150 typically is relatively transparent to x-rays (e.g., having a transmission of greater than about 50% for the x-rays in the energy range commonly used for the imaging procedure). It is further constructed to be substantially hermetic so that ambient moisture does not pass through the cover plate structure to the chamber formed in the assembled device that encloses the scintillator and photosensor array.

FIG. 1 is an elevational crossview of a radiation imager 102 in accordance with a first embodiment of the present invention. A hermetic barrier (or sealing layer) element 200 is embedded within a central portion of the width of a lip 202 and is of a substantially common height with the lip 202, effectively dividing lip 202 into an outer lip portion 203 and an inner lip portion 204. "Hermetic", as used herein, refers to the characteristics of a material that makes it impervious to passage of moisture. "Inner surface" and the like refers to that portion of the cover plate or other component that is disposed towards the chamber enclosing the scintillator and photosensor array. A thin layer of a moisture resistant adhesive 201 between the upper surface of the barrier 200 and a corresponding, mating portion of the opposed, lower surface of the cover 150 adheres the barrier 200 to cover 150. Thin layer, as used above, refers to a layer having a range from a few microns to a millimeter or more; manufacturers typically recommend minimum limits on thickness for particular bonding materials to ensure that they demonstrate desired performance. The moisture resistant adhesive may be of any suitable type, including epoxies, resins and polymers and special such materials such as ultraviolet light carrying epoxies and both thermal and room-temperature setting epoxies, polymers and resins (herein, collectively referred to as an "epoxy"). Epoxy layer 206 adheres the lip 202 to the mating portion of the upper surface of substrate 120. A process for forming the structure of FIG. 1 is disclosed in relation to FIGS. 6–8, discussed below. Since the epoxy layer 206 serves only to adhere the lip 202 to the substrate 120, it can be thin relatively to the thickness of the lip 202. Relatively thin, as used above, refers to the thickness of the layer 206 with respect to the thickness of lip 202; by way of example and not limitation, a lip having a thickness of ¾ mm would commonly have a epoxy layer seal thickness on the order of ⅛ mm thick so that the epoxy layer offers a limited cross sectional areas that is a potential moisture path through the epoxy layer 206.

Figure 2:
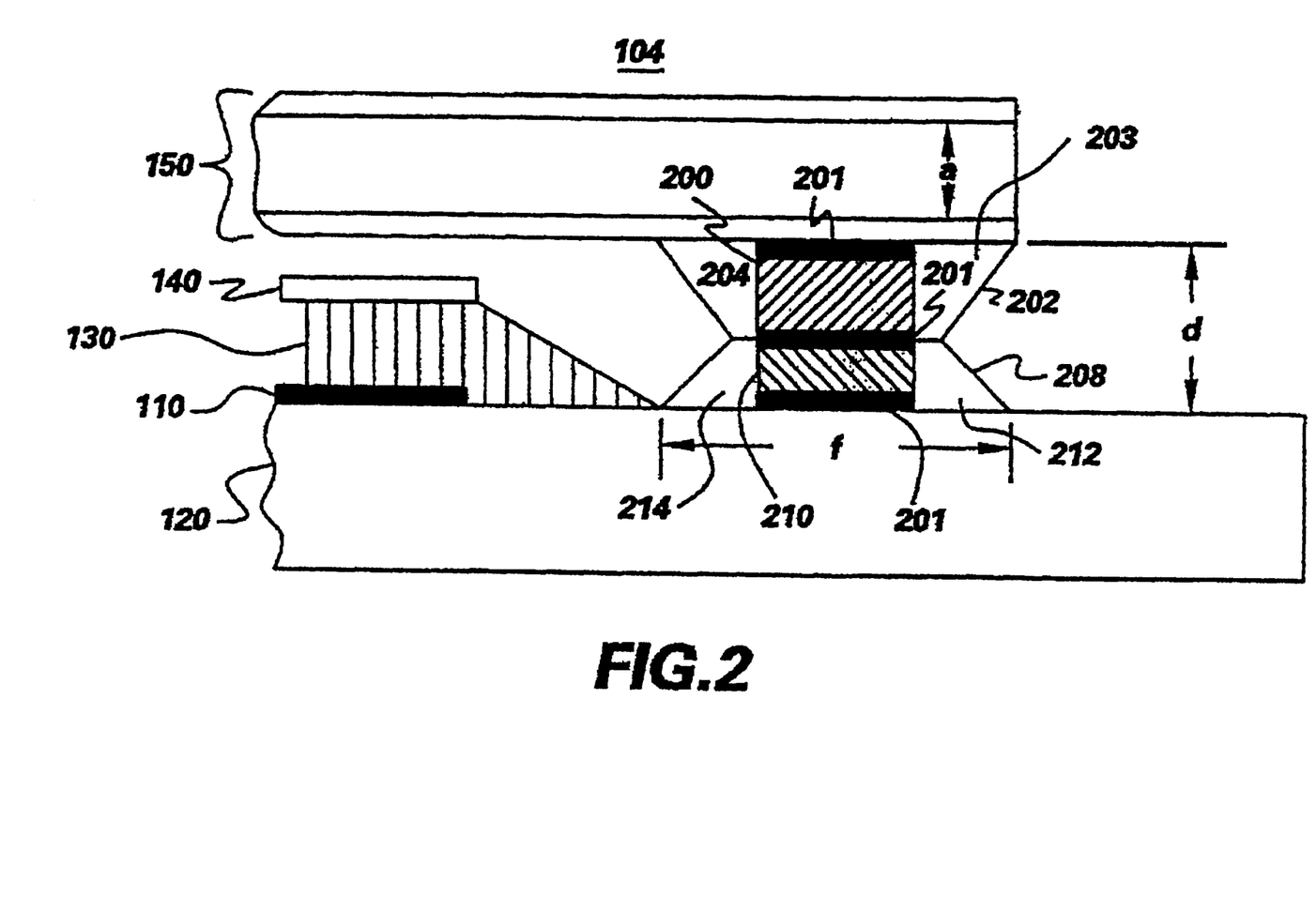
FIG. 2 is a schematic, cross sectional and elevational view of a radiation imager as in FIG. 1 but, in accordance with a second embodiment of the invention.

FIG. 2 is an elevational cross sectional view of a radiation imager 104 in accordance with a second embodiment of the invention and having the same configuration as that of imager 102 of FIG. 1, with the exception that an additional hermetic barrier 210 is provided in a central portion of the lower epoxy layer 208 which, correspondingly, has an outer portion 212 and an inner portion 214. The structure of FIG. 2, accordingly, blocks the migration of moisture through both the lip 202 and the bonding layer 208. Only the thin epoxy bonding layer 201, bonding the upper and lower barrier layers 200 and 210, respectively, to the cover 150, to the substrate 120 and to each other, provide a potential path for moisture migration from the exterior to the interior compartment defined between the cover plate 150 and the substrate 120. As noted above, thin bonding layer 201 refers to the bonding layer thickness relative to the lip 200 thickness.

Figure 3:
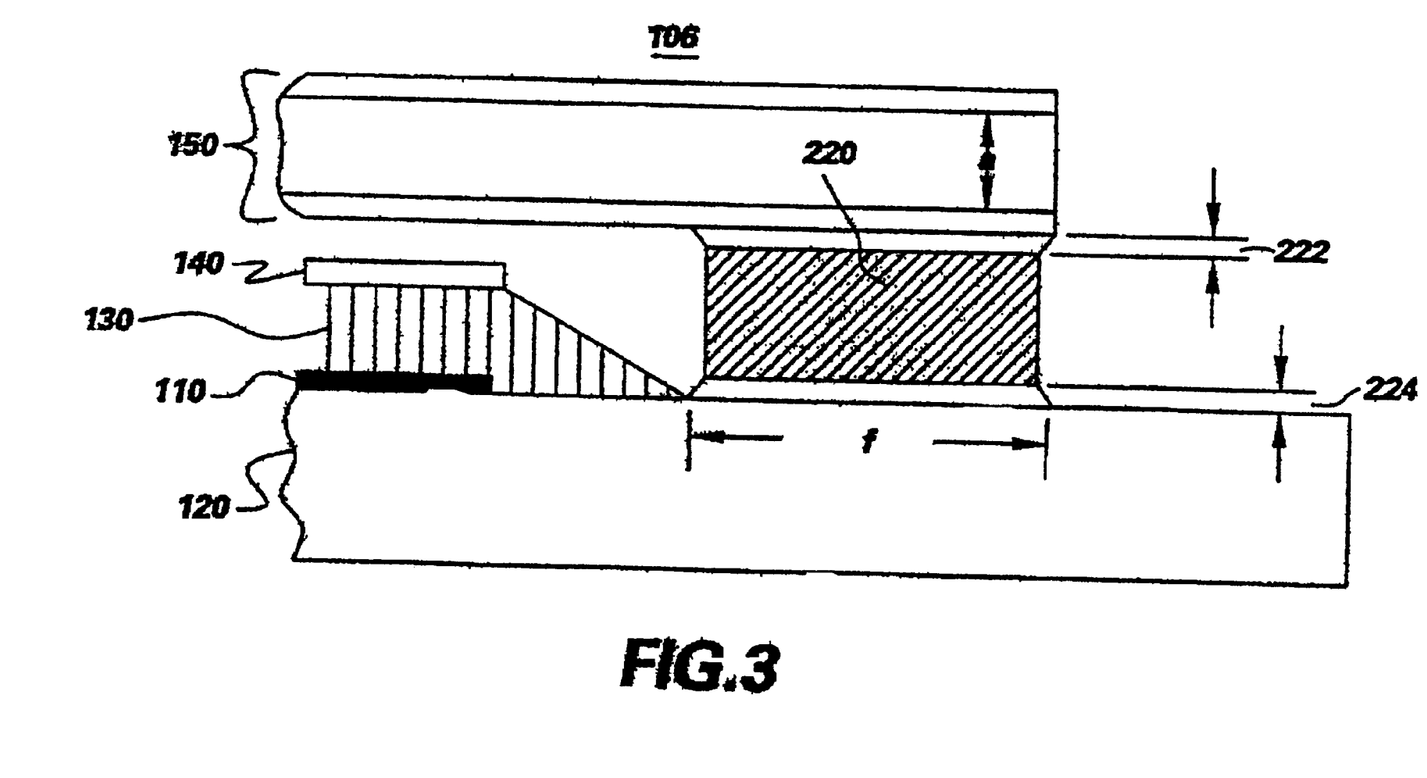
FIG. 3 is a schematic, cross sectional and elevational view of a radiation imager, in accordance with a third embodiment of the invention.

FIG. 3 is an elevational crossview of a radiation imager 106 in accordance with a third embodiment of the invention, in which a hermetic barrier layer 220, bonded to the cover plate 150 by a layer of epoxy 222, effectively forms the lip of the cover plate 150, the barrier layer 220 being bonded to the substrate 120 at its lower surface by a further layer of epoxy 224. The embodiment of FIG. 3 thus employs less epoxy material in the bonding layer than in the layers required by the second embodiment of FIG. 2, further enhancing the blockage of moisture migration from the exterior to the interior.

The hermetic barriers 200, 210, and 220 typically are formed of an inorganic material generally impervious to moisture, such as metal, glass or ceramic. Ideally, the barrier material should correspond to the coefficient of thermal expansion (CTE) of the glass panel 120. The cover plate 150 and the panel glass substrate 120 have a common CTE of about 4.5 ppm/C (parts per million per degree Celsius). A metal that has the same CTE of 4.5 ppm/C is well suited for use as the barrier material. One example is a metal mixture that is approximately 55% iron, 28% nickel, and 17% cobalt and is marketed under the trade name Kovar. Kovar can be bought in sheet form and be etched or electric discharging machined (EDM) to the desired configuration of a metal strip or frame for use as the hermetic barriers in 200, 210 and 220 FIGS. 1 through 3 respectively.

A further candidate barrier material is aluminum. Although aluminum has a CTE five times greater than that of Kovar, aluminum can be used if sufficiently thin to be malleable and thus to conform to the CTE of the panel. Examples are provided below.

Various alternative cross-sectional configurations of the hermetic barriers may be employed as well. While a generally rectangular cross sectional configuration has been shown for the hermetic barriers in FIGS. 1 through 3, alternative cross configurations for the hermetic barrier layers such as a circle, an oval, or a square also function as suitable hermetic barriers.

The material of the hermetic barrier need not have a common CTE with that of the glass substrate 120 in all cases. By way of example and not limitation, a hollow aluminum tube can alternatively be used as the encapsulated hermetic barrier in each of FIGS. 1 through 3. Hollow aluminum microtubes are commercially available from Judson A. Smith Co. of Boyertown, Pa., and from MicroGroup Inc. of Medway, Mass. Although aluminum and steel microtubes do not match the CTE of the panel, if formed with sufficiently thin sidewalls (e.g., about 0.0003 inches) they are sufficiently malleable so as not to introduce a problem. Such microtubes may readily be cut and bent to fit the overall barrier seal size, to a tolerance of about 0.010 inches.

Another alternative type of barrier material is glass. By way of example and not limitation, Corning 1737 glass almost matches the CTE of the substrate 120. Corning 1737 glass has an expansion of 3.5 ppm/C as supplied by the factory, but its CTE increases to 4.5 ppm/C after it has been processed through the thin film deposition process to make the subject panel. The glass can be ground and cut to size. In the alternative, the glass may be supplied in a larger than desired size and drawn down to a desired, smaller size, termed a glass cane. Each hermetic barrier shown in FIGS. 1 and 3 is illustrated as being located centrally of the width of the lip and the epoxy bonding layer. Alternatively, the hermetic barrier is located at either the inside edge or the outside edge (left or right in the figures) of the lip. Alternatively, two hermetic barriers are used simultaneously, one placed at the inside edge and one placed at the outside edge of each epoxy bonding area.

The embodiment illustrated FIG. 1, moreover, may be modified to increase the thickness of layer 202 and the hermetic barrier 200 thereby reducing the thickness of the epoxy bonding layer 206 and, for a sufficiently thin layer 206, even avoiding the need for hermetic barrier 210 as appears in FIG. 2. In theory, all that is needed is a very thin (e.g., 0.001 or less) epoxy seal at the top and bottom of the hermetic barrier. However, in practice, this can be difficult. First, the cover plate 150 may not be sufficiently planar on the lower surface to permit the use of such a very thin seal (i.e., the lower cover plate surface varies by approximately 0.003") without gaps appearing and second, the air trapped under the cover well and expelled when the top is moved in place over the array tends to blow some of the low viscosity epoxy out of the respective, intended seal areas of the epoxy layers 222 and 224 in FIG. 3, for example. The provision of a lip on the cover is as discussed above and below.

Figure 4:
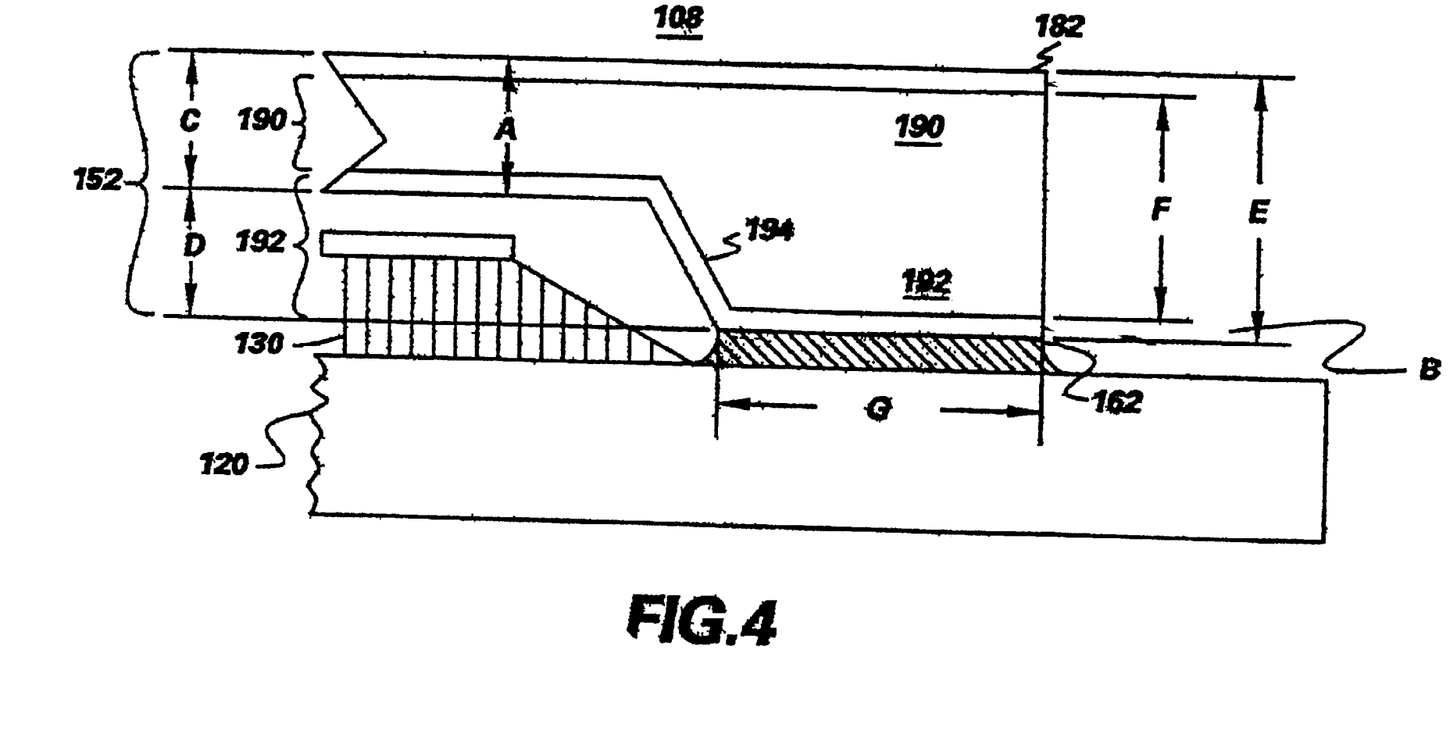
FIG. 4 is a schematic, cross sectional and elevational view of a portion of a cover plate, for a radiation imager, in accordance with a fourth embodiment of the invention.

FIG. 4 is an elevational and crossview of a portion of a cover plate 152 in accordance with a fourth embodiment of the invention, for use with a radiation imager 108 having a substrate 120 and scintillator 130 as in the preceding figures. The cover plate 152, however, differs in that it has a unitary construction of a main portion 190 and an integral lip portion 192 having a sloped sidewall 194 interconnecting the lip portion 192 to the main portion 190, the upper and lower surfaces of the cover plate 152 being covered by respective aluminum films (also referred to as foils) 182 and 162.

The structure of the cover plate 152 is alternatively achieved by forming a uniform thickness layer of Prepreg of thickness F and then machining same so as to produce the central recessed portion of the reduced thickness A, connected by the sloped sidewall 194 to the peripheral lip portion 192 of thickness D. Cover plate 152 has a structure that is one integral piece with different thicknesses in the lip region and central region.

Figure 5:
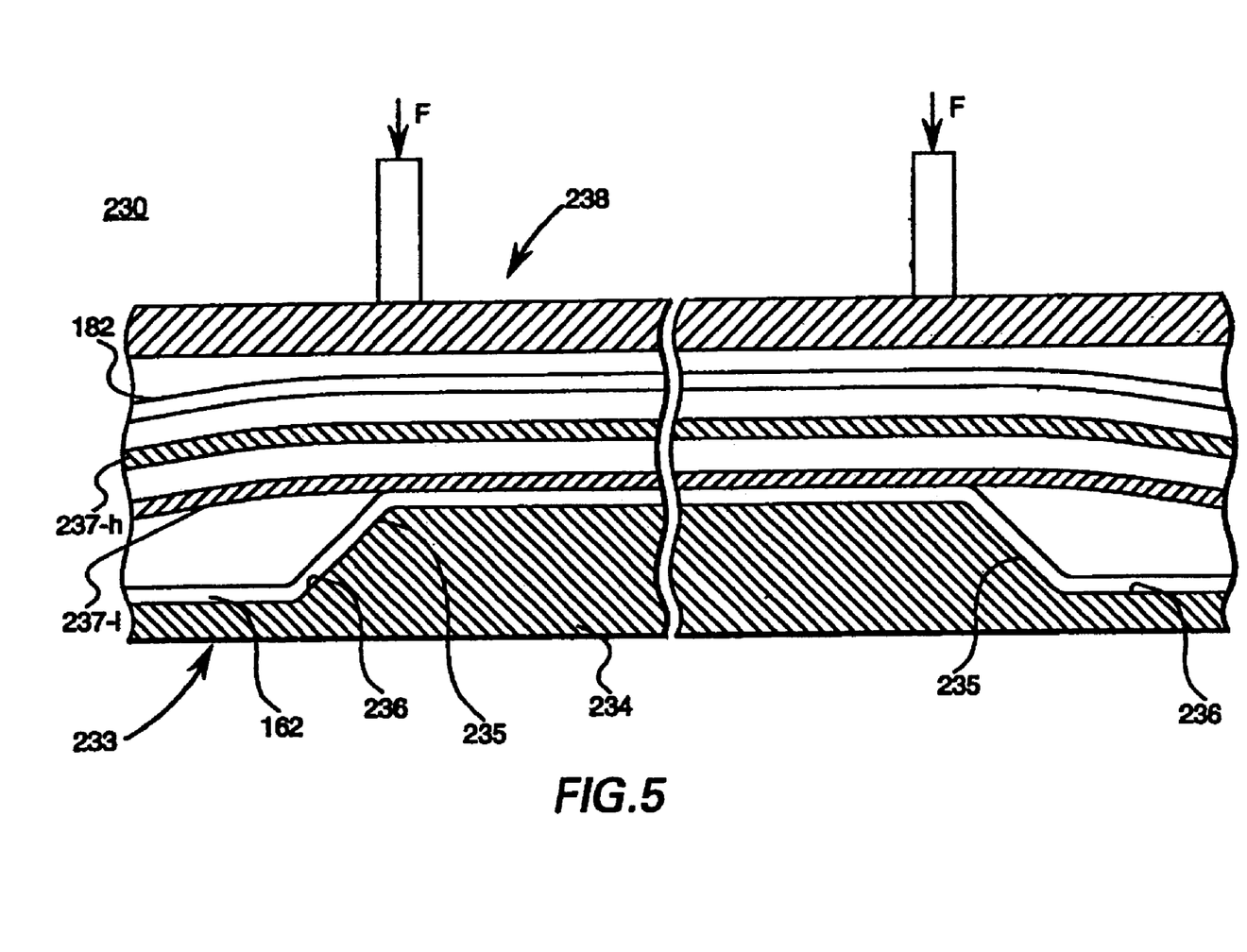
FIG. 5 is a schematic, cross sectional and elevational view of a press used in forming a cover plate as in FIG. 4.

An alternative approach for producing the cover 152 involves the use of a mold 230, shown schematically in FIG. 5. Mold 230 has a base 233 having a thickened, and therefore raised, central portion 234 and a sloped sidewall 235 connecting to a recessed outer portion 236. An aluminum foil 162, or layer of other hermetic sealing material, is placed in the bottom of the mold 230 and then successive layers 237-1 to 237-h of malleable (during processing) fiber constructive material (such as Prepeg), each layer comprising graphite fibers of about 5 mil diameter, are laid within the mold 230, each successive layer rotated by some amount (e.g., 60°) relative to the next prior (i.e., underlying) layer. An upper layer 182 of aluminum, or other hermetic sealing material, is typically placed over the uppermost layer 237 of fibers. A platen 238 then is aligned with the mold 230 and depressed by downward forces F, thereby squeezing, or compressing, the underlying stacked materials while the mold 230 and contents are heated to the desired melting temperature recommended by the manufacturer. The fibers are thus reshaped into the configuration of the cover plate and integral lip and then trimmed along the peripheral edges to the desired configuration and size (i.e., in lateral dimensions) as seen in FIG. 4.

It was observed in the practice of this method that the aluminum film 162 is sufficiently malleable to stretch and extend down the sloped sidewall 235 of the central portion 234 while maintaining structural integrity of the aluminum (i.e., no tearing or perforation that breached the integrity of the metal). The angle of the sloped sidewall 235 relative to the base of the mold 230 is not to be too severe or acute, typically in a range from 5° to 85° and generally approximately 45°.

Figure 6:
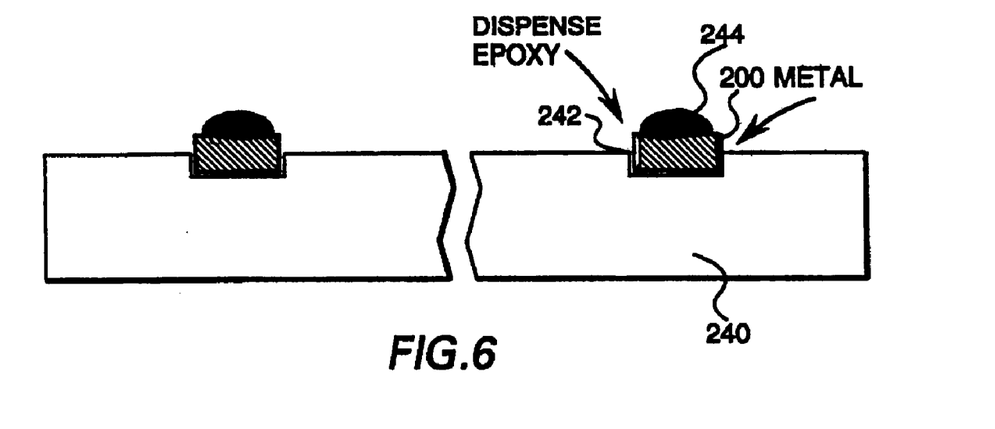
FIGS. 6, 7 and 8 are schematic, elevational and fragmentary views of structures formed in successive steps in the fabrication of the cover plates of FIGS. 1, 2 and 3.
Figure 7:
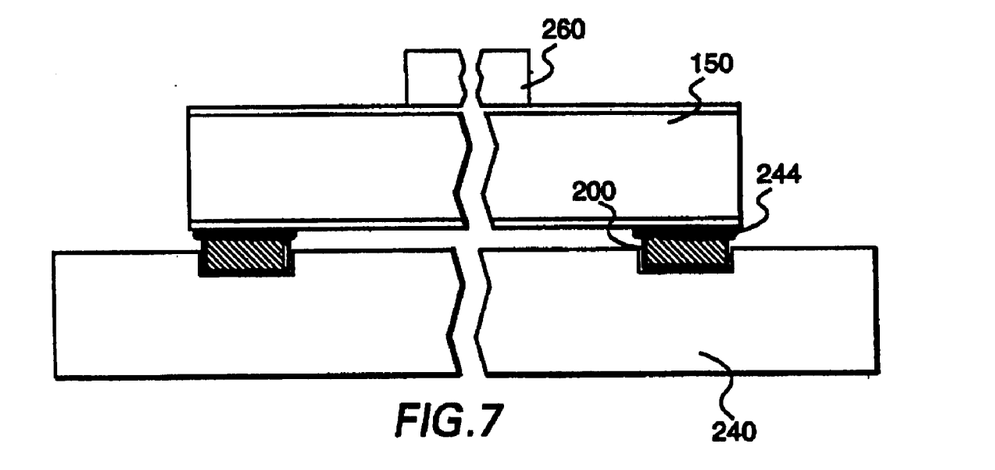
Figure 8:
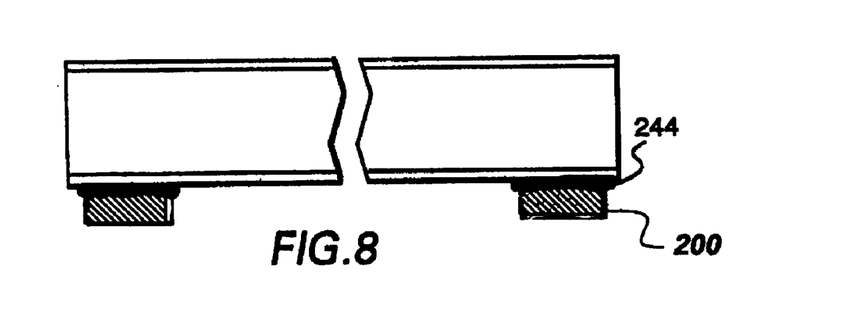

FIGS. 6, 7 and 8 represent successive steps in the fabrication of the respective cover plates of FIGS. 1, 2 and 3. In each of FIGS. 6 and 7, a fixture 240 is formed to have a groove 242 therein which corresponds in width and configuration to that of the hermetic barrier 220 of FIG. 3. The fixture 240 typically has a surface that will not bind to the material and epoxy being fabricated into the cover. The groove 242 is cut in the shape of the seal area, typically a continuous and generally rectangular frameshape corresponding to a perimeter surrounding the scintillator 130. Further, the depth of the groove 242 is selected to be significantly less than the thickness of the hermetic barrier 200 so that the same is received in the groove 242 and protrudes well above the surrounding upper surface of the fixture 240.

Commonly a dispensing nozzle (not shown in FIG. 6) is employed to dispense a bead 244 of epoxy on the exposed, upper surface of the metal hermetic barrier 220.

In FIG. 7, a cover plate 150 is held by a vacuum chuck 260 of an alignment assembly fixture and inserted thereby into the groove fixture 240 so as to engage the epoxy 244 and flatten same to form a thin layer of epoxy 244 adhering the hermetic barrier 200 to the cover plate 150. After drying, the structure appears as shown in FIG. 3.

After curing the epoxy, the cover is removed from the fixture 260 with the hermetic barrier 200 adhered to the cover plate 150, as seen in FIG. 8.

The assembly of the radiation imager 106 may then be completed by inverting the structure of FIG. 8 and then applying a bead of epoxy to the exposed surface of the barrier 220 (or, alternatively, to the mating surface of the substrate 120 on which the barrier is to be placed and fixed) and, using a vacuum chuck, applying a force to the cover so as to flatten the bead of epoxy and form the epoxy layer 224 as shown in FIG. 3, with the cover plate 150 spaced at the appropriate distance from the surface of the substrate 120, typically accomplished through use of micrometers at the four corners of the cover plate 150.

Figure 9:
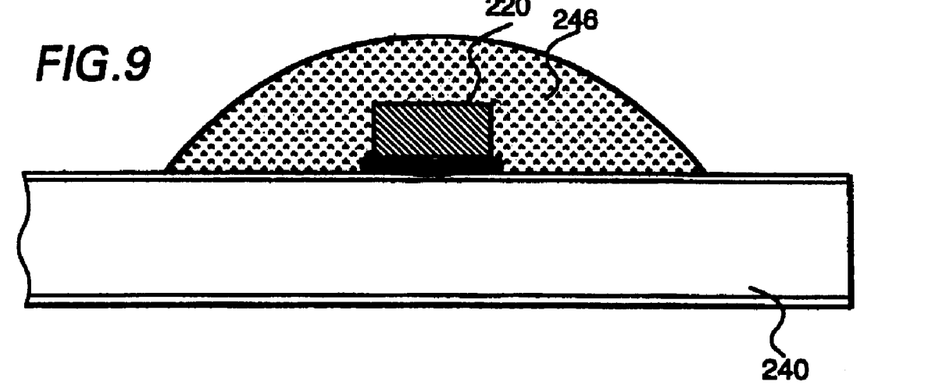
FIGS. 9, 10 and 11 are schematic, partially cross sectional and elevational views of further processing of the structure of FIG. 8 using a planarizing fixture.
Figure 10:
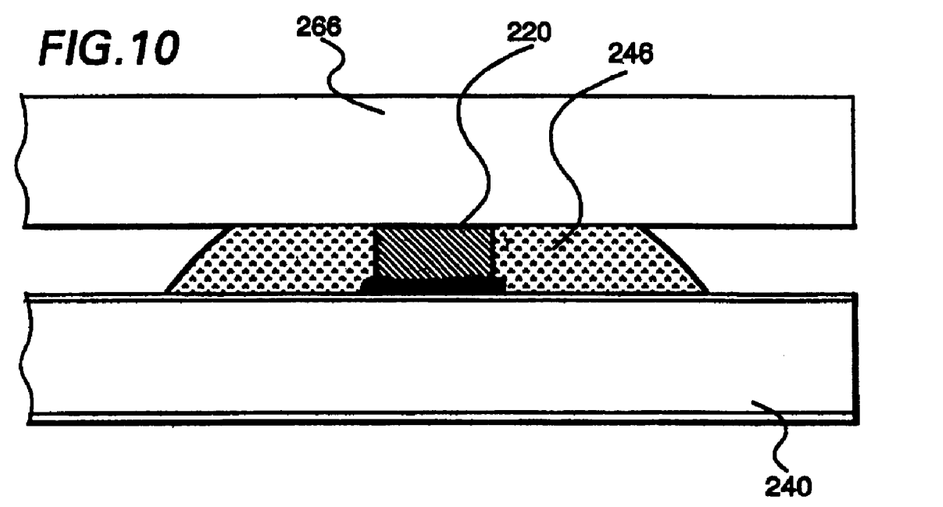
Figure 11:
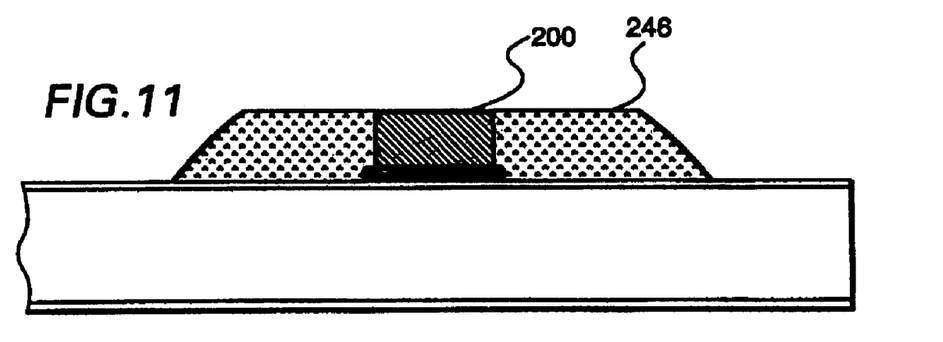

The above process of FIGS. 6 to 8 also can be used to make the lip on the cover, and it can be repeated for the final seal of the lip to the substrate surface. For example, in FIG. 9, the structure of FIG. 8 is reinverted to the orientation as in FIG. 6 and placed in a planarizing fixture (not shown). A dispenser (not shown) dispenses epoxy 246 onto the lip/hermetic barrier layer 220 and then a planarizing element 266, held at a desired spacing from the upper surface of the fixture 240 so as to produce a uniform thickness layer of epoxy 246 of the same height as the hermetic barrier layer 220 and encasing same therein, as shown in FIGS. 9, 10 and 11.

It will be apparent to those skilled in the art that, while the invention has been illustrated and described herein in accordance with the patent statutes, modifications and changes may be made in the disclosed embodiments without departing from the true spirit and scope of the invention. It is, therefore, to be understood that the appended claims are intended to cover all such modifications and changes as fall within the true spirit of the invention

What is claimed is:

1. A cover plate for a solid state radiation imager having a photosensor array dispersed as a substrate and a scintillator optically coupled to the photosensor array, comprising:
    a lip on the inner main surface of the cover plate, at least a portion of the lip comprising a first hermetic barrier; and
    a first moisture resistant adhesive layer sealing and adhering the lip to the substrate.

2. A cover plate as recited in claim 1, wherein:
    the lip comprises a second moisture resistant adhesive layer, formed on the inner main surface of the cover plate adjacent the cover plate periphery and encasing the first hermetic barrier therein.

3. A cover plate as recited in claim 2, wherein the first moisture resistant adhesive layer encases a second hermetic barrier therein, aligned with and sealed to the first hermetic barrier.

4. A cover plate as recited in claim 1, wherein the lip is bonded to the first hermetic barrier layer on the inner main surface of the cover plate.

5. A cover plate as recited in claim 1, wherein:
    the lip comprises a hermetic barrier material.

6. A cover plate as recited in claim 1 wherein at least one of said first hermetic barrier and a second hermetic barrier comprise an inorganic material generally impervious to moisture and selected from the group consisting of metal, glass, and ceramics.

7. A solid state radiation imager having a substrate on a main surface of which are disposed a photosensor array and a scintillator optically coupled to the photosensor array, comprising:
    a cover plate;
    a lip on the inner main surface of the cover plate adjacent a periphery of the cover plate, the lip having a surface remote from the inner main surface of the cover plate and at least a portion of the lip comprising a first hermetic barrier;
    the cover plate and lip being disposed on the main surface of the substrate so as to define an interior space encompassing the scintillator and the photosensor array; and
    a first moisture resistant adhesive layer sealing and adhering the lip at the remote surface thereof to a corresponding portion of the main surface of the substrate.

8. A solid state radiation imager as recited in claim 7, wherein:
    the lip comprises a second moisture resistant adhesive layer, formed on the inner main surface of the cover plate adjacent the cover plate periphery and encasing the first hermetic barrier therein.

9. A solid state radiation imager as recited in claim 8, wherein at least one of said first hermetic barrier and a second hermetic barrier comprise an inorganic material selected from the group consisting of metal, glass, and ceramics.

10. A solid state radiation imager as recited in claim 9, wherein the first moisture resistant adhesive layer encases a second hermetic barrier therein, aligned with and sealed to the first hermetic barrier.

11. A solid state radiation imager as recited in claim 7, wherein the lip is bonded to the first hermetic barrier layer on the inner main surface of the cover plate.

12. A solid state radiation imager as recited in claim 7, wherein:
    the lip comprises a first hermetic barrier material.

13. A solid state radiation imager as recited in claim 12, wherein the lip is bonded to the first hermetic barrier layer on the inner main surface of the cover plate.

14. A solid state radiation imager as recited in claim 12, wherein the first hermetic seal is adhered and sealed to the cover plate by a second moisture resistant adhesive layer therebetween and the lip is adhered and sealed at the remote surface thereof to the main surface of the substrate by the first moisture resistant adhesive layer therebetween.

15. A solid state radiation imager as recited in claim 7, wherein:
    the lip comprises an integral portion of the cover plate, the remote surface thereof extending inwardly from the periphery of the cover plate and parallel to the upper main surface of the cover plate and joining a second, slanted sidewall surface of the lip, in turn joining the inner main surface of the cover plate and extending about and surrounding the interior space; and
    the first hermetic barrier layer is formed on and extends continuously on, and over, the inner main surface of the cover plate, the slanted sidewall surface and the remote surface of the lip.

16. A solid state radiation imager as recited in claim 7, further comprising:
    a second hermetic barrier layer on the outer main surface of the cover plate.

17. A solid state radiation imager as recited in claim 16, wherein the first and second hermetic barrier layers on the inner and outer main surfaces of the cover plate have a coefficient of thermal expansion that is substantially the same value.

18. A solid state radiation imager as recited in claim 17, wherein the cover plate is transparent to X-rays and the respective hermetic barrier layers on the inner and outer main surfaces of the cover plate are formed of a foil of a metal.

19. A solid state radiation imager as recited in claim 7, wherein the hermetic barrier is selected from the class of inorganic materials that is substantially impervious to moisture.

20. A solid state radiation imager as recited in claim 19, wherein the hermetic barrier comprises a composite of iron, nickel, and cobalt.

21. A solid state radiation imager as recited in claim 19, wherein the hermetic barrier is aluminum, sufficiently thin to be malleable and to conform to the coefficient of thermal expansion of the radiation imager.

22. A solid state radiation imager as recited in claim 19, wherein the hermetic barrier comprises a plurality of metal tubes.

23. A solid state radiation imager as recited in claim 19, wherein the hermetic barrier comprises a hollow metal tube of a selected one of round, square and rectangular cross-sections.

24. A solid state radiation imager as recited in claim 7, wherein the moisture resistant adhesive material is selected from the class of expoxies, resins and polymers.

25. A method of forming a cover plate for a solid state radiation imager having a substrate on a main surface of which are disposed a photosensor array and a scintillator optically coupled to the photosensor array, comprising the steps of:

providing a cover plate;

forming a lip on the inner main surface of the cover plate adjacent a periphery of the cover plate, at least a portion of the lip comprising a hermetic barrier by:

providing a fixture having an upper surface and a groove in the upper surface corresponding in configuration to the hermetic barrier and of a depth less than a thickness of the hermetic barrier, placing the hermetic barrier in the groove, forming a first layer of moisture resistant adhesive material on at least an upper main surface of the hermetic barrier, and supporting the cover plate with the inner surface thereof disposed toward and parallel to the common plane of the upper surface of the hermetic barrier and lowering the cover plate to a predetermined distance from the surface of the hermetic barrier thereby to flatten the bead of the moisture resistant adhesive material therebetween to a substantially uniform thickness and permitting the moisture resistant adhesive to cure; and applying a second layer of moisture resistant adhesive on one of the exposed surface of the hermetic barrier and a portion of the substrate main surface corresponding to the hermetic barrier; and assembling the cover plate with the main surface of the substrate at a selected distance therebetween, flattening the second layer of a moisture resistant adhesive material and thereby adhering and sealing the cover plate to the substrate.

26. A method as recited in claim 25, wherein the hermetic barrier comprises the lip.

27. The method as recited in claim 25, wherein the step of applying the moisture resistant adhesive material to the hermetic barrier further comprises:

placing the hermetic barrier in the groove in the fixture;

depositing a bead of moisture resistant adhesive material on at least the hermetic barrier;

planarizing the moisture resistant adhesive material so as to form a second layer of moisture resistant adhesive material having a common height with that of the hermetic barrier;

curing the moisture resistant adhesive material;

applying a third layer of moisture resistant adhesive material to one of the planarized surface of the second layer of moisture resistant adhesive material of common height with the hermetic barrier and the corresponding area of the main surface of the substrate; and assembling the cover plate with the substrate at a prescribed distance between the planarized surface and the substrate main surface so as to cause the third moisture resistant adhesive layer to bond and seal the lip to the corresponding area of the main surface of the substrate.

28. A method as recited in claim 25, wherein the moisture resistant adhesive material is selected from the class of epoxies, resins and polymers.

29. A method of forming a cover plate having an integral lip on a main surface of the cover plate adjacent a periphery of the cover plate, comprising:

providing a mold having a base and a platen movable relatively to the base, the base having a projecting central portion surrounded by a sloped sidewall extending to and joining a deeper portion, measured in an axial direction, relative to the projecting portion;

placing a first hermetic barrier layer on the base;

placing successive layers of composite graphite material, impregnated with resin and having lateral dimensions corresponding to lateral dimensions of the hermetic barrier layer, in the base;

placing a second hermetic barrier layer, having lateral dimensions corresponding to lateral dimensions of the layers of composite graphite material over the last-placed layer of composite graphite material; and moving the platen toward the base so as to compress the layers together, the barrier layer on the surface being malleable and stretching along the sloped sidewall while maintaining structural integrity thereof.

30. A method as recited in claim 29, wherein the step of placing successive layer of composite graphite material further comprises:

rotating each successive layer by a common angular increment so as to achieve a quasicoefficient of expansion of the successive layers, when compressed and molded together.

* * * * *